(12) United States Patent
Yuan et al.

(10) Patent No.: US 8,009,449 B2
(45) Date of Patent: Aug. 30, 2011

(54) DC-TO-AC POWER INVERTER AND METHODS

(75) Inventors: Dalun Yuan, Taipei (TW); Tranh Nguyen, Rohnert Park, CA (US)

(73) Assignee: NPhysics, Inc, Milpitas, CA (US)

( * ) Notice: Subject to any disclaimer, the term of this patent is extended or adjusted under 35 U.S.C. 154(b) by 79 days.

(21) Appl. No.: 12/479,763

(22) Filed: Jun. 5, 2009
(Under 37 CFR 1.47)

(65) Prior Publication Data
US 2010/0309702 A1    Dec. 9, 2010

(51) Int. Cl.
*H02M 7/48* (2007.01)
(52) U.S. Cl. .......................................... 363/71; 363/56.1
(58) Field of Classification Search .................... 363/71, 363/72, 56.1, 78
See application file for complete search history.

(56) References Cited

U.S. PATENT DOCUMENTS

| | | | |
|---|---|---|---|
| 4,222,098 A * | 9/1980 | Frosch et al. ................ | 363/71 |
| 5,027,263 A | 6/1991 | Harada et al. | |
| 5,473,530 A | 12/1995 | Giuseppe et al. | |
| 6,072,707 A * | 6/2000 | Hochgraf ...................... | 363/71 |
| 6,381,154 B1 | 4/2002 | Nguyen | |
| 6,429,629 B1 | 8/2002 | Nguyen | |
| 6,496,059 B1 | 12/2002 | Nguyen | |
| 6,519,167 B1 | 2/2003 | Nguyen | |
| 6,574,124 B2 * | 6/2003 | Lin et al. ...................... | 363/65 |
| 6,853,568 B2 * | 2/2005 | Li et al. ........................ | 363/65 |
| 6,936,975 B2 | 8/2005 | Lin et al. | |
| 7,221,216 B2 | 5/2007 | Nguyen | |
| 7,307,474 B2 | 12/2007 | Nguyen | |
| 7,375,993 B2 * | 5/2008 | Beland ........................ | 363/71 |

OTHER PUBLICATIONS

Young, Lee W., Notification of Transmittal of the International Search Report and the Written Opinion of the International Searching Authority, or the Declaration; Patent Cooperation Treaty, Aug. 10, 2010, International application No. PCT/US10/37417.

* cited by examiner

*Primary Examiner* — Shawn Riley
(74) *Attorney, Agent, or Firm* — Kokka & Backus, PC

(57) ABSTRACT

Embodiments of the invention relate generally to semiconductors for power generation and conversion applications, and more particularly, to devices, integrated circuits, substrates, and methods to convert direct current ("DC") voltage signals to alternating current ("AC") voltage signals. In some embodiments, an inverter can include a modulator configured to convert a direct current signal into a first variable signal, and a transformation module configured to step up the first variable signal to form a second variable signal. The transformation module can be configured to generate a first portion of the second variable signal and a second portion of the second variable signal. Further, the inverter can include a waveform generator configured to synchronize the first portion and the second portion of the second variable signal at a frequency to generate an alternating current ("AC") signal.

30 Claims, 7 Drawing Sheets

US 8,009,449 B2

DC-TO-AC POWER INVERTER AND METHODS

FIELD

Embodiments of the invention relate generally to semiconductors for power generation and conversion applications, and more particularly, to devices, integrated circuits, substrates, and methods to convert direct current ("DC") voltage signals to alternating current ("AC") voltage signals.

BACKGROUND

Inverters are electrical devices that typically include transformers, switches, and control circuits for converting direct current ("DC") voltages to alternating current ("AC") voltages, with the resulting AC voltage being at a particular amplitude (e.g., 120V or 220V) and frequency (e.g., 50 to 60 Hz). Inverters are used in portable appliances, consumer electronics, backup power supplies for telecommunication and computer installations, such as uninterrupted power supplies, or UPS, or other applications that include DC sources of power. Inverters are being used increasingly in power generation and distribution systems based on solar, wind power and fuel cell technologies to convert DC voltages (i.e., variable DC voltages) to 120/220 VAC. In one approach, some traditional "modified sine wave" inverters implement modified square waves to approximate a sinusoidal AC voltage waveform. The modified sine wave inverters, however, use square-shaped waveforms that tend to produce levels of noise that may not be suitable for motors or other applications in which sinusoidal-shaped voltages might be desired.

FIG. 1 depicts another approach to implementing conventional inverters with multiple levels, including a DC-to-DC conversion level and a DC-to-AC conversion level. Examples of some traditional inverters that have multiple levels include class-A/B and class-D inverters, whereby a raw power level is converted into a regulated DC voltage within a first level, and the regulated DC voltage is converted into AC voltage in a second level. Inverter 100 is a multiple-level inverter that includes a DC-to-DC Generator 102 coupled to a DC-to-AC Generator 152. Typically, inverter 100 uses DC-to-DC Generator 102 to boost a DC voltage (e.g., 12VDC or 24VDC) applied to input terminals 104 up to 170VDC, which, in turn, is converted into 120VAC at output terminals ("AC output") 160 by DC-to-AC Generator 152. As shown, DC-to-DC Generator 102 includes a number of relatively large switching devices 108 to drive transformer ("T1") 110 to step up the input DC voltage. DC-to-DC Generator 102 also includes rectifying circuits 112, a filter choke 114 and electrolytic capacitors 120. Filter choke 114 and electrolytic capacitors 120 constitute a reconstruction filter 113 in some conventional inverters. Note that DC-DC control circuit 130 controls switching devices 108 responsive to linear feedback from transformed DC voltages between filter choke 114 and electrolytic capacitors 120. Further to inverter 100, DC-to-AC Generator 152 includes a DC-to-AC control circuit 154, an H-bridge circuit 156, and a filter 158.

While functional, inverter 100 has various drawbacks in its implementation. First, DC-to-DC Generator 102 and DC-to-AC Generator 152 each include control circuits, rectifier circuits and feedback circuits, which consume resources such as semiconductor and computational resources. Second, a current path magnetically coupled from input terminals 104 to output terminals 160 may pass through five semiconductor devices (and their junctions), such as through Q3, Q2, and Q1 of switching devices 108 and through any two of the devices in H-bridge circuit 156, whereby each of the semiconductor devices in the current path dissipates power due to switching and conduction losses. Third, transformer 110 and filter choke 114 may dissipate power due to, for example, core losses and conduction losses. Fourth, the current path also passes (e.g., as ripple current) into electrolytic capacitors 120 as storage capacitors. A ripple current may cause electrolytic capacitors 120 to heat up, thereby drying out the electrolyte material. In some inverters, electrolytic capacitors 120 can be the least reliable components of inverter 100 as the mean time between failures ("MTBF") may be 5 to 7 years, which is not uncommon for an electrolytic capacitors 120. Note that the MTBF for electrolytic capacitors 120 is typically less than the life expectancy of their intended applications (e.g., for use in solar energy generation systems). Note, too, that conduction and switching losses may be associated with rectifying circuits 112. Fifth, transformer 110 typically has multiple windings at the side coupled to rectifying circuits 112. Further, transformer 110 has an amount of windings necessary to step up a DC voltage (e.g., 12VDC or 24VDC) to 170VDC, as well as an amount of iron or core material to support the amount of windings, whereby the amount of windings and the amount of core material may contribute respectively to conduction losses and core losses.

It is desirable to provide improved techniques, systems, integrated circuits, and methods that minimize one or more of the drawbacks associated with devices, integrated circuits, substrates, and methods for convert direct current voltage signals to alternating current voltage signals.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1:
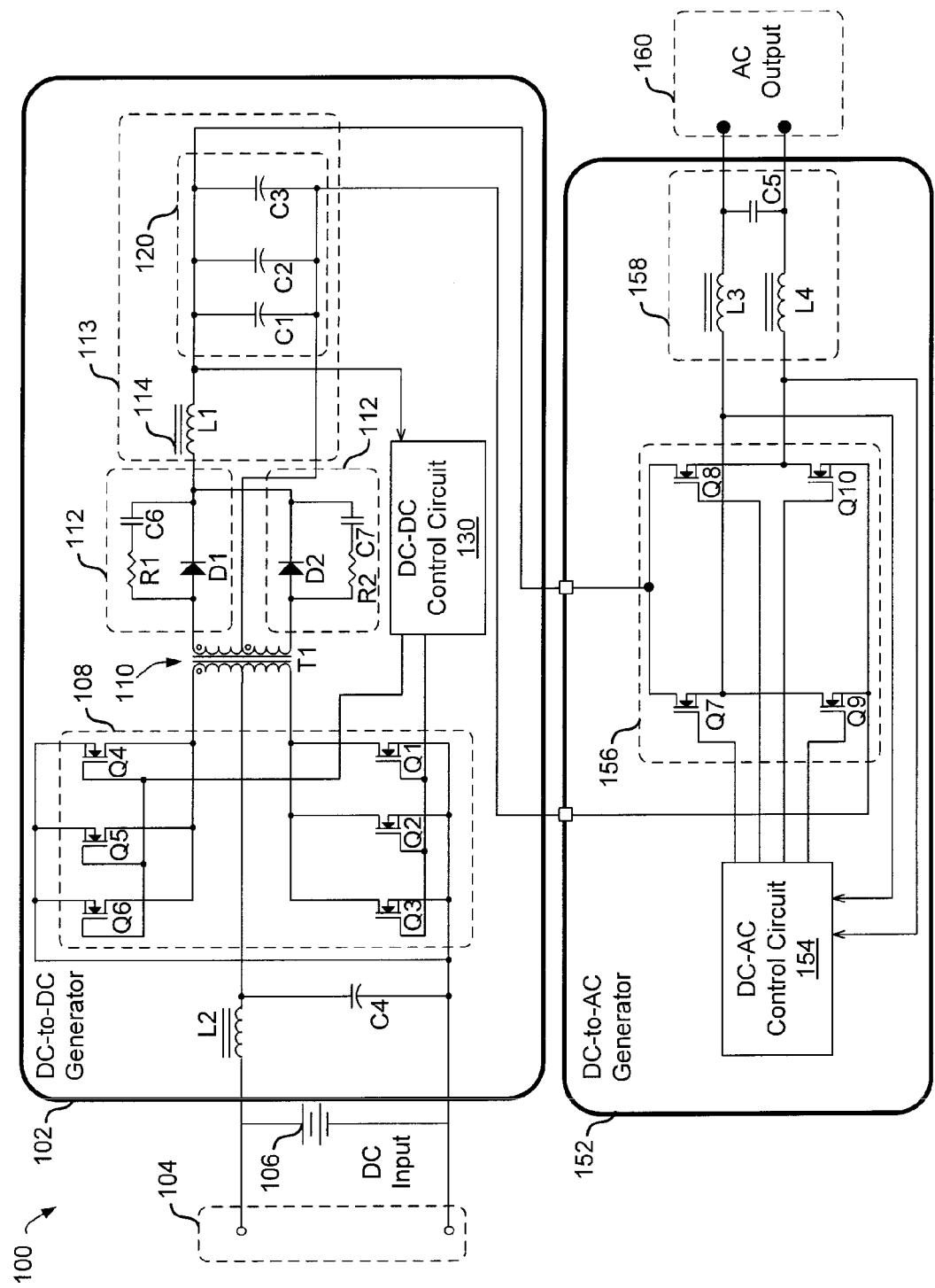
FIG. 1 depicts another approach to implementing conventional inverters with multiple levels, including a DC-to-DC conversion level and a DC-to-AC conversion level.
Figure 2:
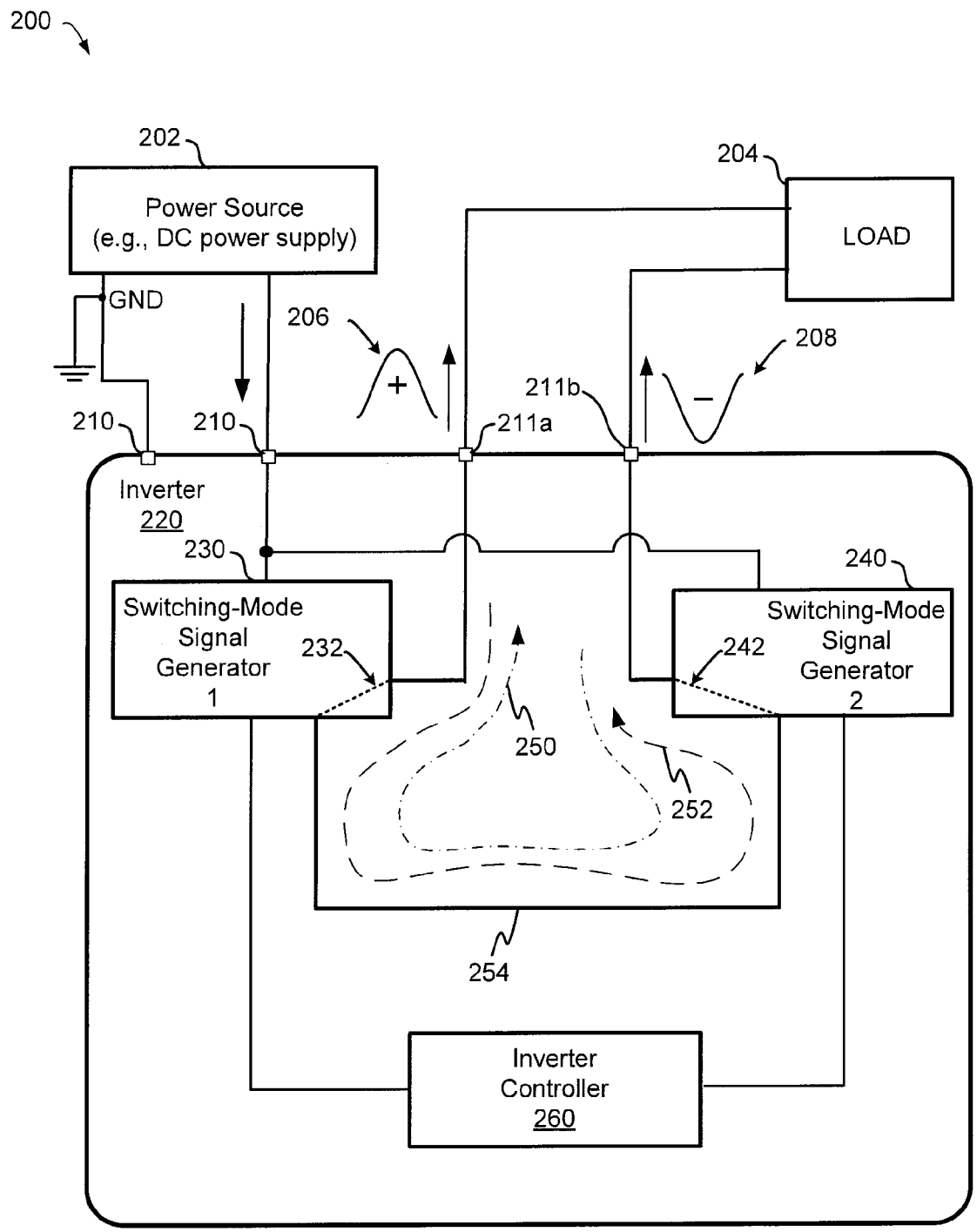
FIG. 2 is a diagram depicting an inverter in accordance with various embodiments of the invention.

FIG. 2 is a diagram depicting an inverter in accordance with various embodiments of the invention. Diagram 200 depicts an inverter 220 is configured to couple via input terminals 210 to a power source 202, and to couple further via output terminals 211a and 211b to a load 204. Inverter 220 operates to convert a direct current ("DC") signal, such as a DC voltage signal, at input terminals 210 to an alternating current ("AC") signal, such as an AC voltage signal, at output terminals 211a and 211b. Inverter 220 also includes a switching-mode signal generator ("1") 230 coupled between input terminals 210 and an output terminal 211a, a switched-mode power generator ("2") 240 coupled between input terminals 210 and an output terminal 211b, and an inverter controller 260. Further, inverter 220 includes a path 254 coupling switching-mode signal generator 230 and switching-mode signal generator 240 in series with each other. Inverter 220 also includes an inverter controller 260 that is coupled to switching-mode signal generator 230 and switching-mode signal generator 240, and is configured to control operation of each of switching-mode signal generators 230 and 240. For example, inverter controller 260 can control switching-mode signal generators 230 and 240 in a first mode and a second mode of operation, respectively, for inverter 220. Specifically, inverter controller 260 can cause switching-mode signal generator 230 to generate a first portion of an output voltage signal in the first mode, and can cause switching-mode signal generator 240 to generate a second portion of the output voltage signal in the second mode. In some embodiments, the first portion of an output voltage signal is portion 206 of the AC signal and the second portion is portion 208 of the AC signal. Further, inverter controller 260 can be configured to operate switching-mode signal generator 240 as a short-circuit path portion 242 in the first mode, and to operate switching-mode signal generator 230 as a short-circuit path portion 232 in the second mode. Therefore, inverter controller 260 can configure switching-mode signal generator 230 to convey a current 252 (e.g., a load current) to switching-mode signal generator 240 in the first mode, and can configure switching-mode signal generator 240 to convey a current 250 to switching-mode signal generator 230 in the second mode.

In view of the foregoing, inverter 220 can separate the generation of the portions of the AC signal converted from a DC signal. Accordingly, switching devices (not shown) in switching-mode signal generators 230 and 240 can be subject to less than the peak-to-peak voltage ("Vp-p") of the AC signal (e.g., one-half of Vp-p). For example, if the root-mean-square ("RMS") voltage of the AC signal is 120 VAC, then the switching devices operate with voltage differences of, for example, about one-half. In some embodiments, the size and/ or requirements of the switching devices (e.g., transistors, such as MOSFET transistors) can be different than otherwise might be the case when peak-to-peak voltages are applied to the switching devices. For example, the switching devices or MOSFET transistors can have reduced sizes, which, in turn, can reduce capacitances associated with relatively larger sizes. As another example, MOSFET transistors in switching-mode signal generators 230 and 240 can be configured to operate with less current (e.g., amounts of current that are approximately one-half that associated with the magnitude of the peak-to-peak voltage). Thus, the MOSFET transistors in switching-mode signal generators 230 and 240 can be designed to consume less power than otherwise might be the case. Further, the reliability components of switching-mode signal generators 230 and 240 can be enhanced by reducing the currents, according to at least some embodiments. In specific embodiments, inverter 220 can be configured to operate without storing DC voltage, and/or can omit implementation of reconstruction filters and/or electrolytic capacitors, which can enhance reliability than otherwise might be the case. As switching-mode signal generators 230 and 240 can be configured to operate differently in different modes, each can operate as a closed switch in alternating modes to produce different portions of the sine wave. Therefore, switching-mode signal generators 230 and 240 can serve as a return path for load current in the different modes of operation. As used herein, the term "switching-mode signal generator" can refer, at least in some embodiments, to a circuit or firmware, or a combination thereof, that is configured to generate amounts of voltage or current as a power supply, with switching devices being configured to switch between states (e.g., between on and off) at rates higher than the frequency of the AC voltage signal generated at output terminals 211a and 211b.

Figure 3:
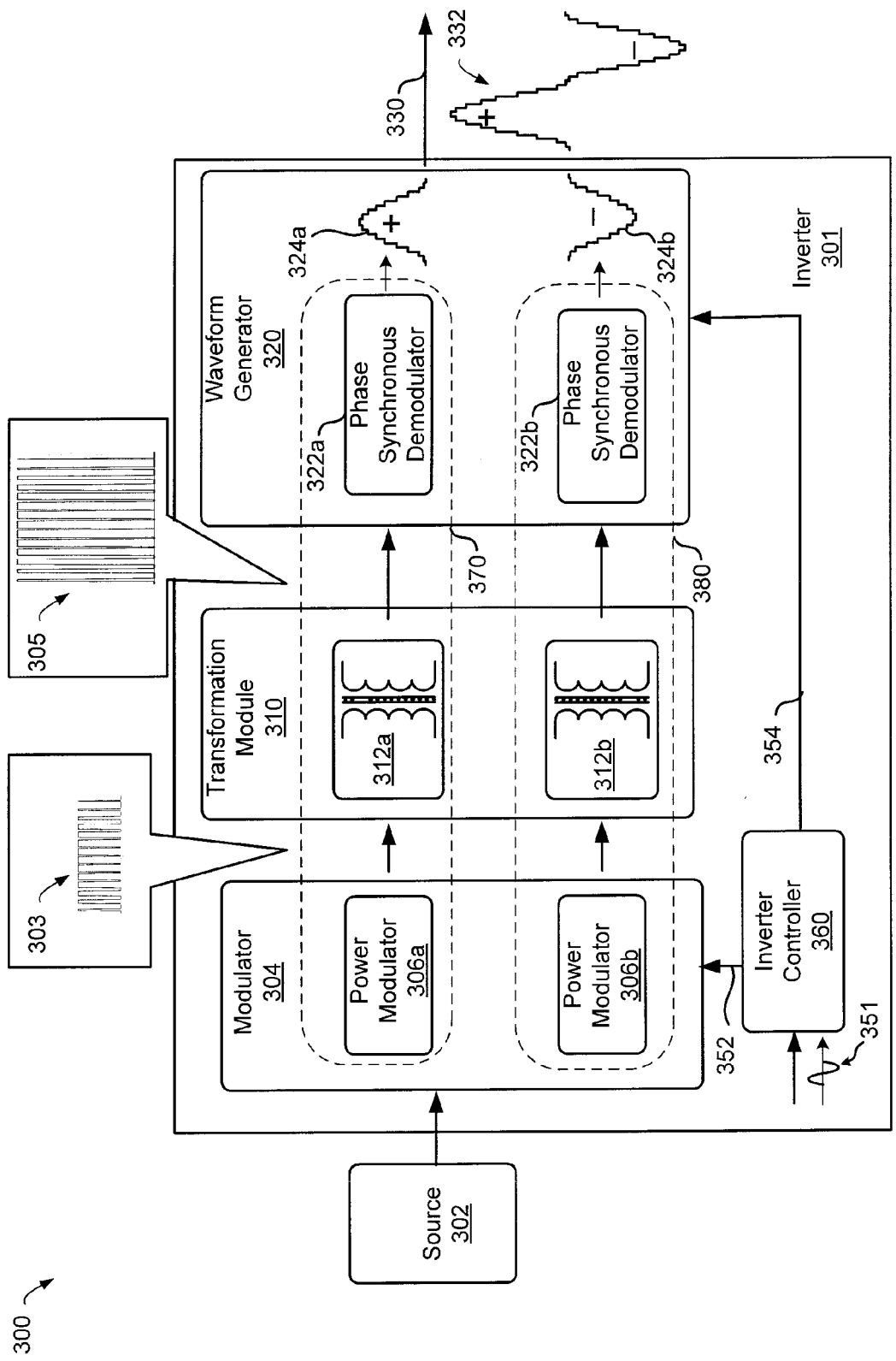
FIG. 3 is a diagram depicting an inverter in accordance with at least some embodiments of the invention.

FIG. 3 is a diagram depicting an inverter in accordance with at least some embodiments of the invention. Diagram 300 depicts an inverter 301 including a modulator 304, a transformation module 310, a waveform generator 320, and an inverter controller 360. Inverter 301 is coupled between a source 302, which can be a DC power source, and one or more output terminals 330 to provide an alternating current ("AC") signal AC signal 332. Modulator 304 can be modulator configured to convert a direct current ("DC") signal into a variable signal. As used herein, the term "variable signal" can refer, at least in some embodiments, to signal that varies with respect to a reference potential. A variable signal can be a DC signal that varies its magnitude, for example, above (e.g., positive DC values) or below (e.g., negative DC values) a reference potential, such a ground. One example of such a variable signal is a pulse width modulated signal (e.g., a pulsing DC waveform), such as waveform 303. According to some embodiments, the term "variable signal" also can be referred to as an AC signal that varies its magnitude, for example, about a reference potential, such zero VAC, or other reference potentials. The term "variable signal" also can be used interchangeably with "voltage signal," according to some embodiments. Transformation module 310 can be configured to step up the first variable signal to form a second variable signal. An example of a second variable signal is depicted as waveform 305. Transformation module 310 also is configured to generate a first portion of the second variable signal and a second portion of the second variable signal. Waveform generator 320 can be configured to synchronize the first portion and the second portion of the second variable signal at a frequency (e.g., at 60 Hz) to generate AC signal 332.

Inverter 301 can include a polarity circuit 370 configured to generate a portion 324a of the alternating current signal 332 (e.g., at a first output terminal with a second output terminal being associated with a reference potential), and a polarity circuit 380 configured to generate another portion 324b of the alternating current signal 332 (e.g., at a second output terminal with a first output terminal being associated with the reference potential). Note that in some instances, the term "polarity circuit" can be used interchangeably with "inverter portion circuit." In some embodiments, polarity circuits 370 and 380 each can include multiple portions of modulator 304, transformation module 310, and waveform generator 320, each of which can operate to form either portions 324a or 324b.

Modulator 304, for example, can include power modulator 306a and power modulator 306b, any of which can be configured to operate as any circuit that can convert a fixed (or substantially fixed) DC signal into a variable signal. Examples of such a circuit include a DC chopper circuit (or equivalent) that can form the variable signal, such as a variable DC signal. Inverter controller 360 can be configured to generate control signals that can be applied via path 352 to modulator 304 to generate pulsing voltage levels, whereby inverter controller 360 can be configured to modulate the pulsing voltage levels responsive to a sine wave signal 351. In some embodiments, the first variable voltage signal can have a magnitude (e.g., a voltage difference between peaks) substantially equivalent to that of fixed input voltage signal.

Inverter controller 360 can be configured to transmit a first signal or set of signals via path 352 to modulator 304 to vary the direct current signal to form the first variable signal (e.g., modulating the DC signal to form the first variable signal at a rate of change or frequency).

Transformation module 310 can include transformers 312a and 312b, whereby one of transformers 312a and 312b operates for an interval of time and the other is disabled simultaneous (or substantially simultaneous) to the operation of the first. Thus, current flows through one or the other during the interval of time. In some embodiments, transformers 312a and 312b can be configured to step up the variable signal by a smaller amount than otherwise might be the case. Therefore, transformers 312a and 312b can include less core material than otherwise might be the case. In some embodiments, a reduction in core material can facilitate a reduction in copper losses. Further, transformers 312a and 312b can be sized smaller than transformers configured to step up the variable signal by larger amounts. With a smaller relative size, transformers 312a and 312b can have a reduced mean length per turn ("MLT"), which, in turn, can reduce resistive losses, according to some embodiments.

Waveform generator 320 can include phase synchronous demodulator 322a and phase synchronous demodulator 322b, whereby one of phase synchronous demodulators 322a and 322b operates for an interval of time and the other operates as a short-circuit or return path for a load current. In some embodiments, any of synchronous demodulators 322a and 322b can be configured do detect a frequency of an AC reference signal (e.g., 60 Hz) and can synchronize portions of a second variable signal from transformation module 310 with the AC reference signal. In some instances, the phases of portions of a second variable signal can be aligned with the phases of the AC reference signal. Thus, synchronous demodulators 322a and 322b can produce portions 324a and 324b, respectively, to form the alternating current signal 332 synchronized with a frequency. In some embodiments, inverter controller 360 can receive the AC reference signal (e.g., 60 Hz) and can transmit a second signal or set of signals via path 354 to waveform generator to synchronize portions of the alternating current signal to form AC signal 332.

Figure 4:
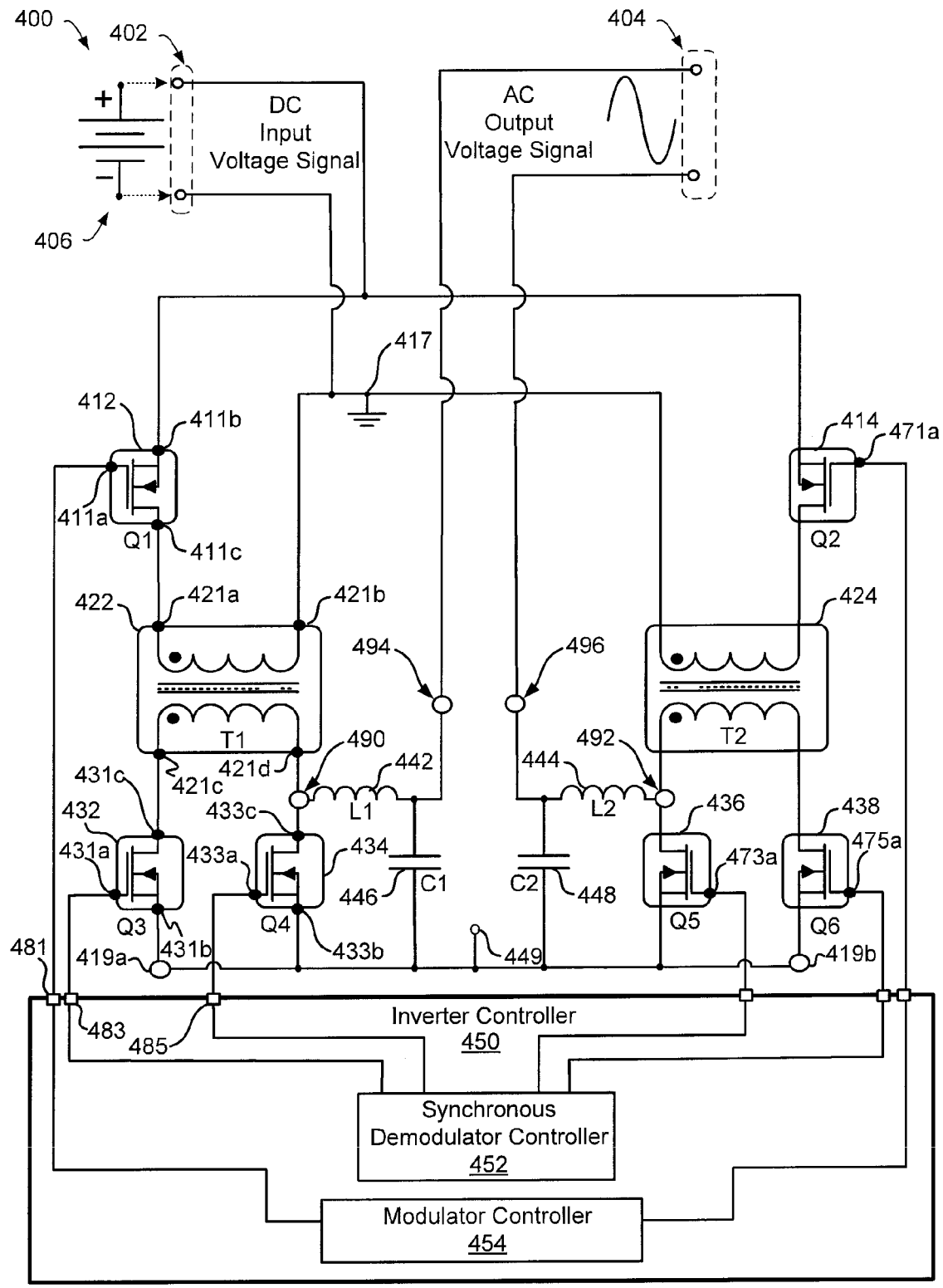
FIG. 4 is depicts an inverter in accordance with at least some embodiments of the invention.

FIG. 4 is depicts an inverter in accordance with at least some embodiments of the invention. Inverter 400 includes switching devices and transformers coupled to an inverter controller 450. As shown, inverter 400 includes DC input terminals 402 to which a DC source 406 can be coupled, and includes output terminals 404 to provide an AC voltage signal. In some embodiments, devices 412 and 414 constitute a modulator, transformers 422 and 424 constitute a transformation module, devices 432 and 434 constitute a portion of a waveform generator, and devices 436 and 438 constitute another portion of the waveform generator. In some embodiments, inverter 400 can include a first polarity circuit and a second polarity circuit. The first polarity circuit can include a device ("Q1") 412, a transformer ("T1") 422, and devices ("Q3") 432 and ("Q4") 434, and the second polarity circuit including a device ("Q2") 414, a transformer ("T2") 424, and devices ("Q5") 436 and ("Q6") 438. A path that couples the first polarity circuit and the second polarity circuit in series can extend from node 419a to node 419b.

The first polarity circuit can be structured as follows. Device 412 can be a MOSFET device (e.g., an n-channel power CMOS transistor) having a source terminal 411b configured to receive a direct current signal, a gate terminal 411a, and a drain terminal 411c. Transformer 422 can include a first winding between a winding terminal 421a and a winding terminal 421b, and a second winding between a winding terminal 421c and a winding terminal 421d. As shown, winding terminal 421a is coupled to drain terminal 411c of device 412, and winding terminal 421b is coupled to ground potential reference node 417 associated with DC source 406. A portion of the waveform generator can include devices 432 and 434. Device 432 can be a MOSFET having a gate terminal 431a, a drain terminal 431c coupled to winding terminal 421c, and a source terminal 431b coupled via node 419a to a reference potential at terminal 449 (and along the path from node 419a to node 419b). Device 434 can be a MOSFET having a gate terminal 433a, a drain terminal 433c coupled to winding terminal 421d, and a source terminal 433b coupled to the reference potential associated with terminal 449. Further, drain terminal 433c can serve as an output terminal 490, according to some embodiments. Inverter controller 450 is coupled to gate terminal 411a to transmit via terminal 481 to a control signal (e.g., a pulse width modulated signal) configured to generate a first variable signal. Further, inverter controller 450 can be coupled via terminal 483 to gate terminal 431a and via terminal 485 to gate terminal 433a to transmit one or more control signals to synchronize the alternating current signal at a frequency. The second first polarity circuit can be structured similarly. The above-described devices and transformers can be modified or supplemented with other components in other embodiments. For example, while FIG. 4 depicts the use of NMOS device, note that PMOS devices or any other MOS device or semiconductor technology can used to form the switching devices in an inverter. In alternate embodiments, device 412 can be disposed in between a node 417 associated with the ground potential reference and winding terminal 421b rather than as shown in FIG. 4. In one embodiment, one of devices 432 and 434 can be omitted and substituted with a short-circuited path portion. Inverter 400 and it elements shown in FIG. 4 are merely illustrative of one of a number of structures that can be used to implement the functionality of converting DC into AC, according to various embodiments.

In some embodiments, inverter 400 can also include a low pass filter including inductor ("L1") 442 and a capacitor ("C1") 446, and another low pass filter including inductor ("L2") 444 and a capacitor ("C2") 448. Further, the low pass filter including inductor 442 and capacitor 446 can be coupled between output terminal 490 and terminal 449, and the low pass filter including inductor 444 and capacitor 448 can be coupled between output terminal 492 and terminal 449. Inverter controller 450 can be configured to couple alternately output terminal 490 and output terminal 492 via the first low pass filter and the second low pass filter, respectively, to output terminals 494 and 496, which correspond to output terminals 404. In some embodiments, inverter controller 450 can be configured to operate in the first mode to couple the output terminal 494 via the first low pass filter to a switching-mode signal generator composed of the first polarity circuit (as described above), and to couple output terminal 496 via the second low pass filter to a reference potential at terminal 449. Further, inverter controller 450 can be configured to operate in the second mode to couple output terminal 496 via the second low pass filter to another switching-mode signal generator composed of the second polarity circuit (as described above), and to couple output terminal 494 via the first low pass filter to the reference potential at terminal 449.

Inverter controller 450 includes a synchronous demodulator controller 452 and a modulator controller 454. In a first mode of operation, modulator controller 454 is configured to transmit a control signal to gate terminal 411a to modulate the DC signal from input terminals 402, and is further configured to transmit another control signal to a gate terminal 471a of device 414 to place device 414 in an open-circuit condition, thereby preventing current flow to disable transformer 424. Further to the first mode of operation, synchronous demodulator controller 452 can be configured to transmit a subset of signals to gate terminals 431a and 433a to operate devices 432 and 434 to perform synchronous demodulation (e.g., phase matching to synchronize with a frequency, such as 60 Hz), and can be further configured to transmit another subset of control signals to gate terminals 473a and 475a of respective devices 436 and 438 so that devices 436 and 438 operate as short-circuit path portions. In a second mode of operation, modulator controller 454 is configured to transmit a control signal to gate terminal 471a of device 414 to modulate the DC signal from input terminals 402, and is further configured to transmit another control signal to gate terminal 411a to place device 412 in an open-circuit condition, thereby preventing current flow to disable transformer 422. Further to the second mode of operation, synchronous demodulator controller 452 can be configured to transmit a subset of signals to gate terminals 473a and 475a of respective devices 436 and 438 so that devices 436 and 438 operate to perform synchronous demodulation. Synchronous demodulator controller 452 can be further configured to transmit another subset of control signals to gate terminals 431a and 433a to operate devices 432 and 434 as short-circuit path portions.

Figure 5A:
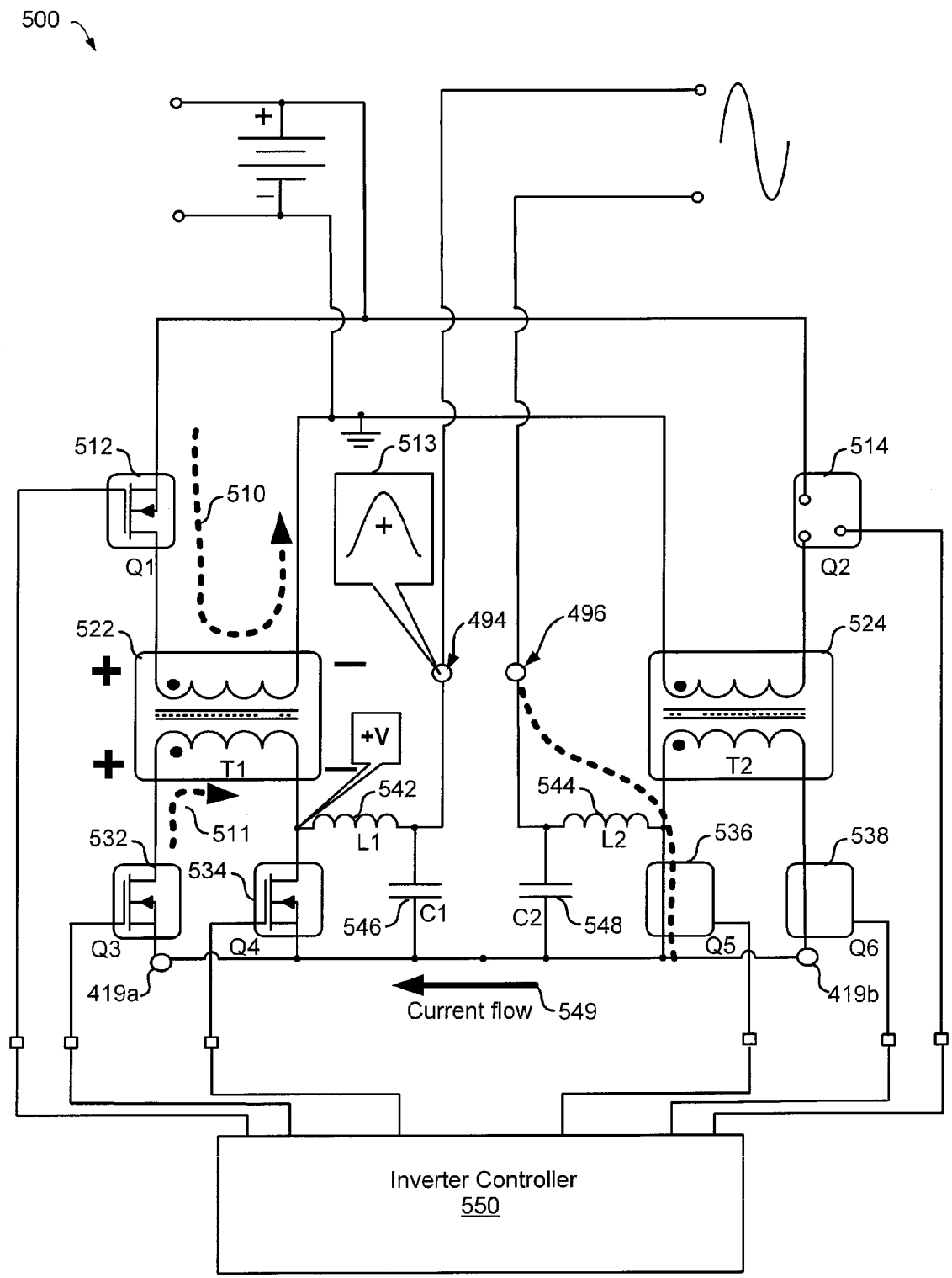
FIGS. 5A and 5B illustrate modes of operation of an inverter, according to embodiments of the invention.
Figure 5B:
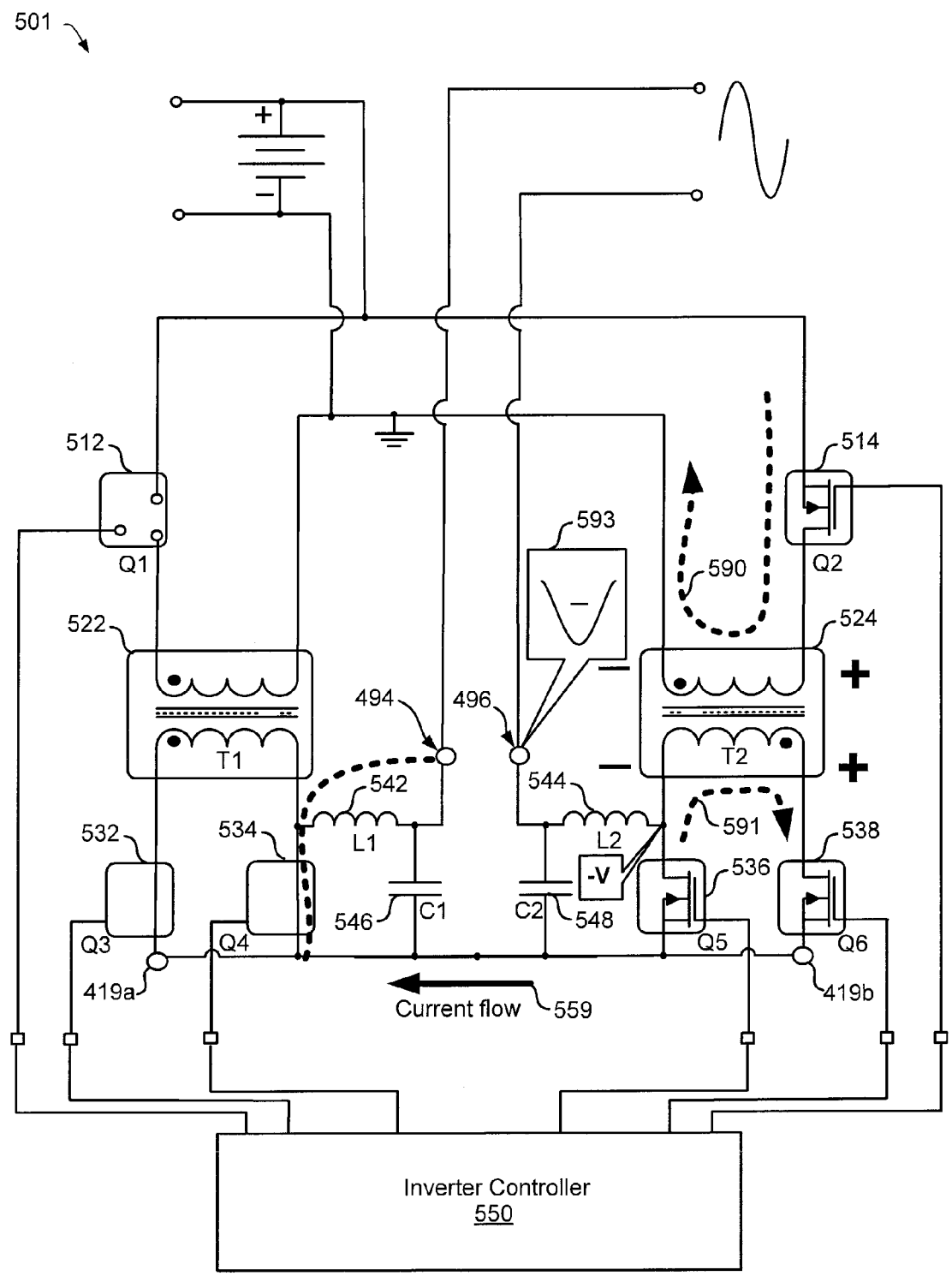

FIGS. 5A and 5B illustrate modes of operation of an inverter, according to embodiments of the invention. In FIG. 5A, inverter 500 operates in a first mode of operation under the control of inverter controller 550. In the first mode, device 512 is configured to modulate a DC voltage to generate variable voltage and current 510, which is applied to transformer 522. A transformed voltage and current 511 is generated to pass through at least device 532, when devices 532 and 534 operate to generate a waveform portion synchronized to a reference AC signal frequency. In some instances, device 532 and device 534 can cooperate to generate an AC current for wave portion 513 that passes through inductor 542 and node 494, thereafter returning to inverter 500 via node 496 so that the current 549 flows down a path between node 419b to node 419a. In one embodiment, device 532 in the first mode can be predominantly in an on condition, with device 534 operating to predominantly demodulate the current to synchronize with a reference AC signal. Inverter controller 550 can control the operation of current 551 by switching device 534 between on and off conditions at rates determined by inverter controller 550. Further, inverter controller 550 can cause device 514 to operate as an open-circuit and devices 536 and 538 to operate as close-circuit path portions, thereby disabling transformer 524. In this configuration, output terminal 496 is associated with a reference potential, and output terminal 494 is associated with a waveform portion 513, which includes positive values with respect to the reference potential. In FIG. 5B, inverter 500 operates in a second mode of operation under the control of inverter controller 550. In the second mode, device 514 is configured to modulate a DC voltage to generate variable voltage and current 590, which is applied to transformer 524. A transformed voltage and current 591 is generated to pass through devices 536 and 538, which are configured to synchronize waveform portion to a reference AC signal frequency. In some instances, device 536 and device 538 can cooperate to generate an AC current for wave portion 593, whereby current 591 passes through device 538 and flows down a path as current 559 between node 419b to node 419a and out of inverter 501 via node 494. The current returns via node 496 through inductor 544. In one embodiment, device 538 in the second mode can be predominantly in an on condition, with device 536 operating to predominantly demodulate the current to synchronize with a reference AC signal. Inverter controller 550 can control the operation of current 591 by switching device 536 between on and off conditions at rates determined by inverter controller 550. Further, inverter controller 550 causes device 512 to operate as an open-circuit and devices 532 and 534 to operate as close-circuit path portions, thereby disabling transformer 522. In this configuration, output terminal 494 is associated with a reference potential, and output terminal 496 is associated with a waveform portion 593, which includes negative values with respect to the reference potential.

Figure 6:
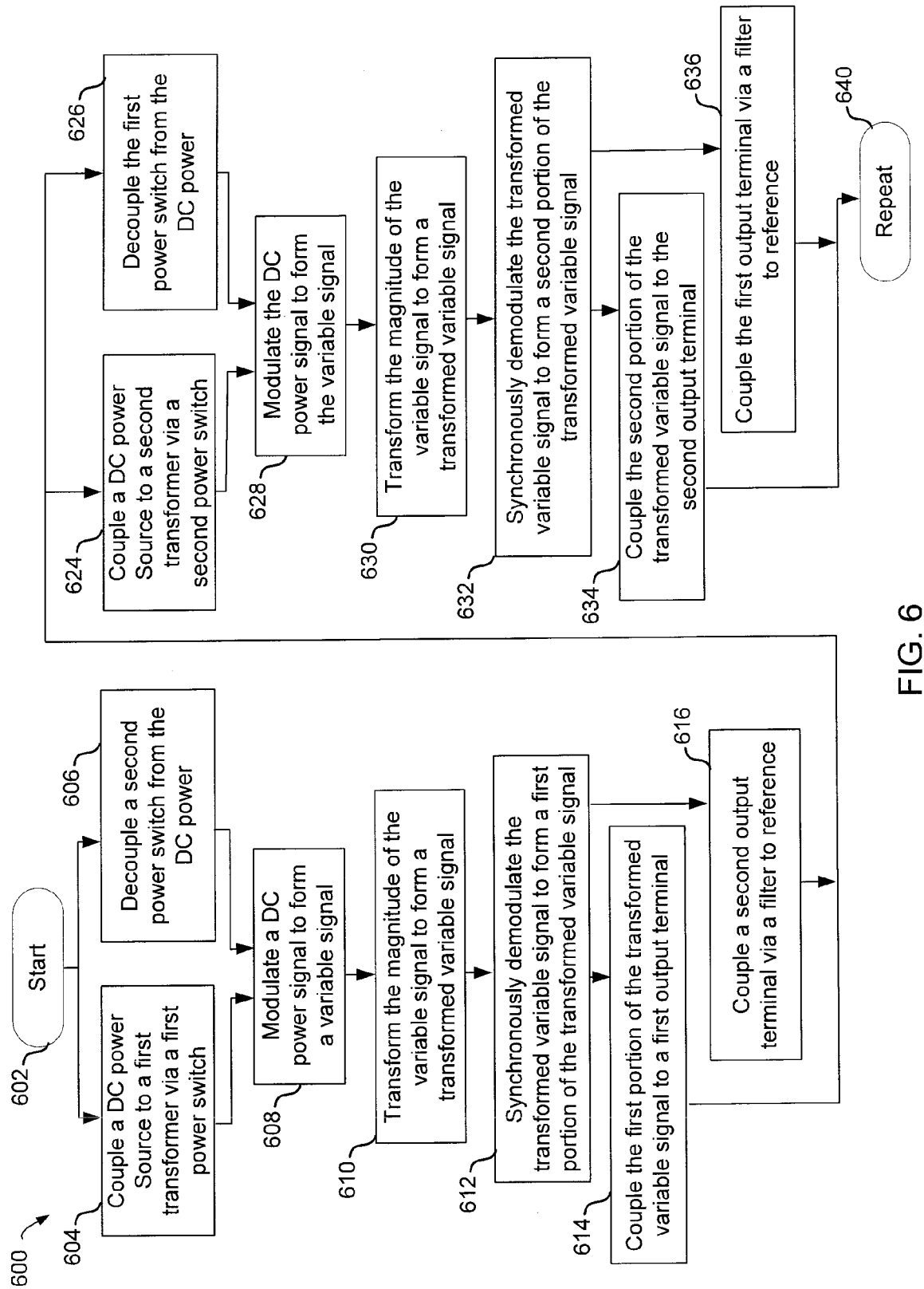
FIG. 6 illustrates an example of a flow for a method of operating an inverter, according to embodiments of the invention.

FIG. 6 illustrates an example of a flow for a method of operating an inverter, according to embodiments of the invention. Flow 600 begins at 602, after which a DC power source is coupled via a first power switch to a first transformer at 604 and a second power switch is decoupled from the DC power source at 606. At 608, the DC power signal is modulated to form a variable signal. At 610, the inverter transforms the magnitude of the variable signal to form a transformed variable signal. At 612, the inverter synchronously demodulates a transformed variable signal to form a first portion of the transformed variable signal. Then, the inverter can couple the first portion of the transformed variable signal to a first output terminal at 614, while coupling a second output terminal via an optional filter to reference potential at 616. At 624, the DC power source is coupled via the second power switch to a second transformer, and the first power switch is decoupled from the DC power source at 626. At 628, the DC power signal is modulated to form another variable signal. At 630, the inverter transforms the magnitude of the other variable signal to form another transformed variable signal. At 632, the inverter synchronously demodulates the other transformed variable signal to form a second portion of the transformed variable signal. Then, the inverter can couple the second portion of the transformed variable signal to the second output terminal at 634, while coupling the first output terminal via an optional filter to reference potential at 636. A cycle of AC signal generation is completed at 640, after which the inverter can repeat the above-described flow 600 to generate other cycles.

Various embodiments or examples of the invention may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

In some embodiments, a computer simulation program can be configured simulate or model the behavior the structures described herein. Thus, instructions to simulate the inverter of the various embodiments can be embedded in a computer readable medium, whereby the instructions can cause a processor to function in accordance with the various methods and structures described herein.

The term "computer readable medium" refers, at least in one embodiment, to any medium that participates in providing instructions to a processor for execution. Such a medium can take many forms, including but not limited to, non-volatile media, volatile media, and transmission media. Non-volatile media includes, for example, optical or magnetic disks, such as a disk drive. Volatile media includes dynamic memory, such as a system memory. Transmission media includes coaxial cables, copper wire, and fiber optics, including wires that comprise a bus. Transmission media can also take the form of electromagnetic, acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, time-dependent waveforms, or any other medium from which a computer can read instructions.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. In some examples, the methods, techniques and processes described herein may be performed and/or executed by executable instructions on computer processors, for which such methods, techniques and processes may be performed (e.g., to simulate the methods and structures described herein). For example, one or more processors in a computer or other display controller may implement the methods describe herein by executing software instructions in a program memory accessible to a processor. These can be varied and are not limited to the examples or descriptions provided.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of to any embodiment; rather features and aspects of one example can readily be interchanged with other examples. Notably, not every benefit described herein need be realized by each example of the invention; rather any specific example may provide one or more of the advantages discussed above. In the claims, elements and/or operations do not imply any particular order of operation, unless explicitly stated in the claims. It is intended that the following claims and their equivalents define the scope of the invention.

The invention claimed is:

1. An inverter comprising:
   a modulator configured to convert a direct current ("DC") signal into a first variable signal;
   a transformation module configured to step up the first variable signal to form a second variable signal, the transformation module being configured to generate a first portion of the second variable signal and a second portion of the second variable signal; and
   a waveform generator configured to synchronize the first portion and the second portion of the second variable signal to an alternating current ("AC") reference signal to generate an ACS signal.

2. The inverter of claim 1 wherein the transformation module comprises:
   a first transformer and a second transformer; and
   an inverter controller configured to implement one of the first transformer and the second transformer and to disable simultaneously the other of the first transformer and the second transformer.

3. The inverter of claim 1 further comprising:
   a first polarity circuit configured to generate a portion of the AC signal at a first output terminal; and
   a second polarity circuit configured to generate another portion of the AC signal at a second output terminal.

4. The inverter of claim 3 further comprising:
   a first low pass filter coupled to the first output terminal;
   a second low pass filter coupled to the second output terminal; and
   an inverter controller configured to couple alternately the first output terminal and the second output terminal via at least a portion of the first low pass filter and at least a portion of the second low pass filter, respectively, to a reference potential.

5. The inverter of claim 3 wherein the first polarity circuit and the second polarity circuit comprise:
   transistors configured to receive one-half of a peak-to-peak magnitude or less of the AC signal.

6. The inverter of claim 3 further comprising:
   an inverter controller configured to transmit a first signal to the modulator to vary the DC signal to form the first variable signal, and is configured further to transmit a second signal to the waveform generator to synchronize the AC signal.

7. The inverter of claim 3 further comprising:
   an inverter controller configured to couple the second output terminal and the first output terminal to a reference potential during a first interval and a second interval, respectively, and to generate the portion of the AC signal at the first output terminal and the another portion of the AC signal at the second output terminal during the first interval and the second interval, respectively.

8. The inverter of claim 3 further comprising:
   a path coupling the first polarity circuit and the second polarity circuit in series, the first polarity circuit and the second polarity circuit being configured to alternately source current to each other.

9. The inverter of claim 3 wherein one of the first polarity circuit and the second polarity circuit comprises:
   a portion of the modulator;
   a portion of the transformation module coupled to the portion of the modulator; and
   a portion of the waveform generator coupled to the portion of the transformation module.

10. The inverter of claim 9 wherein the portion of the modulator comprises:
a first MOSFET having a first source terminal configured to receive the DC signal, a first gate terminal and a first drain terminal.

11. The inverter of claim 10 wherein the portion of the transformation module comprises:
a transformer having a first winding between a first winding terminal and a second winding terminal, and a second winding between a third winding terminal and a fourth winding terminal, the first winding terminal being coupled to the first drain terminal,
wherein the second winding terminal is configured to couple to a ground potential reference for the DC signal.

12. The inverter of claim 11 wherein the portion of the waveform generator comprises:
a second MOSFET having a second gate terminal, a second drain terminal coupled to the third winding terminal, and a second source terminal coupled to a reference potential.
a third MOSFET having a third gate terminal, a third drain terminal coupled to the fourth winding terminal and one of the first output terminal and the second output terminal, and a third source terminal coupled to the reference potential.

13. The inverter of claim 12 further comprising:
an inverter controller coupled to the first gate terminal to transmit a first pulse width modulated signal configured to generate the first variable signal, and further coupled to the second gate terminal and the third gate terminal to transmit one or more control signals to synchronize the AC signal at a frequency.

14. The inverter of claim 9 wherein another of the first polarity circuit and the second polarity circuit comprises:
another portion of the modulator;
another portion of the transformation module coupled to the another portion of the modulator; and
another portion of the waveform generator coupled to the another portion of the transformation module.

15. The inverter of claim 14 further comprising:
an inverter controller coupled to the another portion of the modulator to transmit a control signal causing the another portion of the modulator to behave as an open-circuit, and further coupled to the another portion of the waveform generator to transmit another control signal to cause the another portion of the waveform generator to behave as a short-circuit.

16. The inverter of claim 1 further comprising:
a DC-to-AC inverter.

17. An inverter comprising:
one or more terminals configured to receive an input voltage signal;
a first switching-mode signal generator coupled to the one or more terminals and configured to generate a first portion of an output voltage signal in a first mode;
a second switching-mode signal generator coupled to the one or more terminals and configured to generate a second portion of the output voltage signal in a second mode; and
an inverter controller coupled to the first switching-mode signal generator and the second switching-mode signal generator, the inverter controller being configured to operate the second switching-mode signal generator as a short-circuit path in the first mode and operate the first switching-mode signal generator as another short-circuit path in the second mode.

18. The inverter of claim 17 wherein the first switching-mode signal generator and the second switching-mode signal generator are coupled in series.

19. The inverter of claim 17 further comprising:
a path coupling the first switching-mode signal generator and the second switching-mode signal generator in series,
wherein the path is configured to provide a path to convey a current from the first switching-mode signal generator to the second switching-mode signal generator in the first mode, and to convey another current from the second switching-mode signal generator to the first switching-mode signal generator in the second mode.

20. The inverter of claim 17 wherein the input voltage signal and the output voltage signal are a direct current voltage signal and an alternating current voltage signal, respectively.

21. The inverter of claim 17 wherein each of the first switching-mode signal generator and the second switching-mode signal generator is configured to:
convert the input voltage signal into a first voltage signal; and to
modify the first voltage signal to generate a second voltage signal having a range of voltage values.

22. The inverter of claim 21 wherein the first switching-mode signal generator and the second switching-mode signal generator are configured to:
generate the range of voltage values as positive voltages in the first mode and as negative voltages in the second mode, respectively.

23. The inverter of claim 21 wherein the first voltage signal is variable voltage signal.

24. The inverter of claim 17 wherein each of the first switching-mode signal generator and the second switching-mode signal generator comprises:
a transformer configured to transform a first alternating voltage signal having a magnitude substantially equivalent to that of the input voltage signal into a second alternating voltage signal to provide another magnitude for the output voltage signal.

25. The inverter of claim 17 further comprising:
a first output terminal;
a first low pass filter coupled to the first output terminal;
a second output terminal; and
a second low pass filter coupled to the second output terminal.

26. The inverter of claim 25 wherein the inverter controller is configured to:
operate in the first mode to couple the first output terminal via the first low pass filter to the first switching-mode signal generator and to couple the second output terminal via the second low pass filter to a reference potential; and to
operate in the second mode to couple the second output terminal via the second low pass filter to the second switching-mode signal generator and to couple the first output terminal via the first low pass filter to the reference potential.

27. An inverter comprising:
input terminals configured to receive a direct current ("DC") signal;
a modulator including subsets of modulator MOSFET devices configured to convert a DC signal into a first variable signal;
transformers configured to convert the first variable signal to form a first portion of a second variable signal during a first interval, and to form a second portion of the second variable signal during a second interval;

a waveform generator including subsets of waveform generator MOSFET devices configured to synchronize the first portion and the second portion of the second variable signal to a range of frequencies to generate an alternating current ("AC") signal;

output terminals; and an inverter controller configured to couple the input terminals via a first subset of the modulator MOSFET devices to a first transformer of the transformers and to decouple the input terminals from a second transformer of the transformers using a second subset of the modulator MOSFET devices during one interval of the first or second intervals, the inverter controller being configured further to couple the first transformer via a first subset of waveform generator MOSFET devices to a first output terminal of the output terminals and to couple a second output terminal of the output terminals via a second subset of waveform generator MOSFET devices to a reference potential during the one interval.

28. The inverter of claim 27 wherein the inverter controller comprises:

a modulator controller configured to transmit a pulse width modulation signal to one or more gate terminals of the first subset of the modulator MOSFET devices responsive to modulate the DC signal, the modulator controller being configured further to generate a signal that places the second subset of the modulator MOSFET devices into an open state.

29. The inverter of claim 27 wherein the inverter controller comprises:

a synchronous demodulator controller configured to detect a reference frequency and to apply a control signal to one or more gate terminals of the first subset of waveform generator MOSFET devices to synchronize portions of the second variable signal to the reference frequency.

30. The inverter of claim 27 wherein the inverter controller is configured to couple the input terminals via the second subset of the modulator MOSFET devices to the second transformer and to decouple the input terminals from the first transformer using the first subset of the modulator MOSFET devices during another interval of the first or second intervals, the inverter controller being configured further to couple the second transformer via the second subset of waveform generator MOSFET devices to the second output terminal and to couple the first output terminal via the first subset of waveform generator MOSFET devices to the reference potential during the another interval.

* * * * *